June 24, 1930.  S. R. LAWTON  1,768,364
TOP BRACKET
Filed March 2, 1929
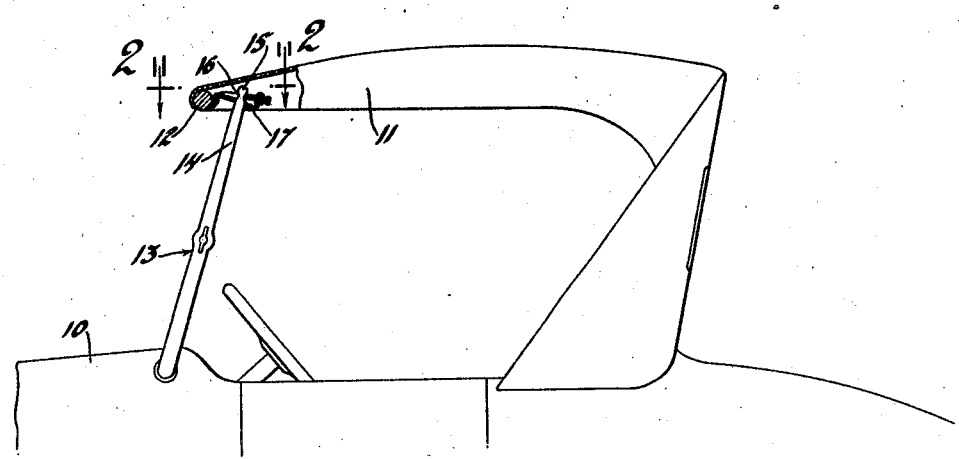
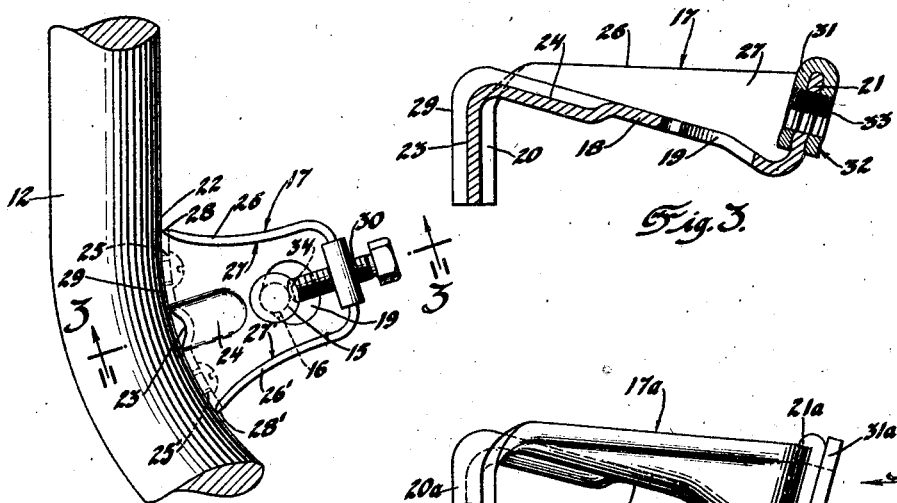
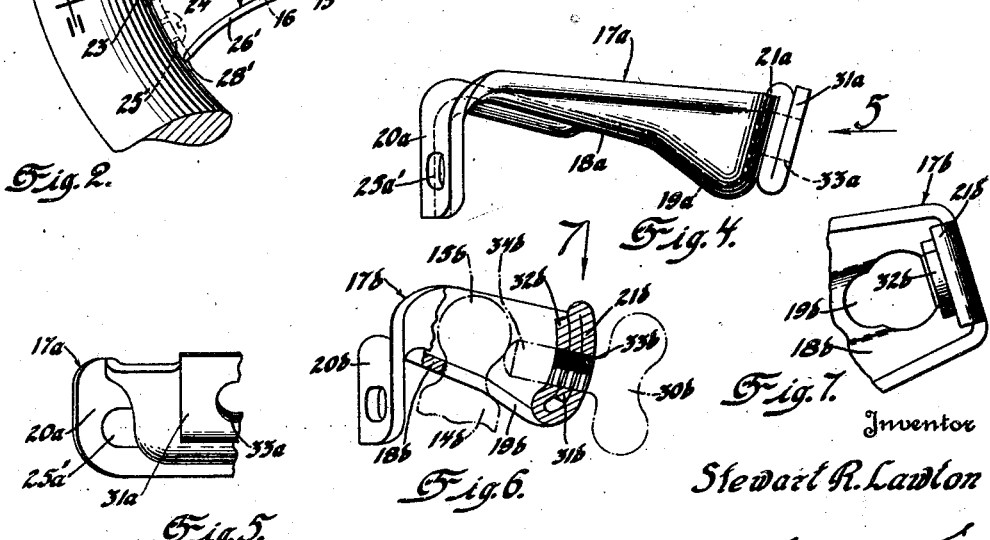
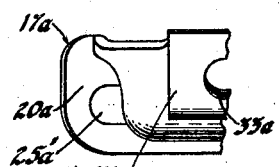
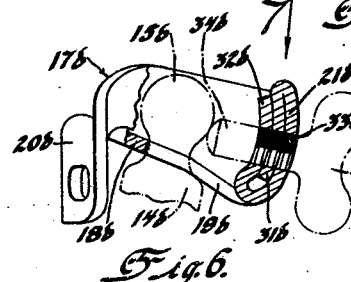
Inventor
Stewart R. Lawton
By Blackmore, Spencer n Fairk
Attorney Patented June 24, 1930

1,768,364

UNITED STATES PATENT OFFICE

STUART R. LAWTON, OF DETROIT, MICHIGAN, ASSIGNOR TO GENERAL MOTORS CORPORATION, OF DETROIT, MICHIGAN, A CORPORATION OF DELAWARE

TOP BRACKET

Application filed March 2, 1929. Serial No. 344,020.

The bracket to which this invention relates is intended specifically for use in connection with so-called one-man tops, as employed upon various models of automotive vehicles; and it is a special object of this invention to provide inexpensive and highly efficient means for conveniently and reliably connecting a front frame element of a vehicle top with an upwardly extending stanchion element or post of the general character commonly provided at the ends of wind shields.

The post referred to being assumed to upwardly terminate in rounded heads which have constrictions or necks therebelow, and it is an object of this invention to provide, preferably from sheet metal, a comparatively rugged bracket, this being ordinarily Z-shaped in longitudinal section, upwardly concave, and including suitably curved and/or reinforced flanges disposed at an angle to the body thereof and through which threaded elements may extend. Said threaded elements serve respectively to secure the bracket to a front frame element of the mentioned top and to receive a screw which is adapted to engage the mentioned head or neck upon the projection of said head through an aperture, preferably key-hole-shaped or otherwise adapted to render a head self-retaining in said bracket.

Other objects of this invention, including features of reinforcement and features whereby a longitudinal adjustment of the bracket upon a frame element is facilitated, may be best appreciated from the following description of alternative forms of said bracket, taken in connection with the appended claim and accompanying drawing.

Fig. 1 is a side elevational view showing a vehicle top as secured by means comprising one embodiment of the present invention, parts being broken away.

Fig. 2 is an enlarged plan view, taken somewhat as suggested by the line 2—2 of Fig. 1.

Fig. 3 is a vertical sectional view, on a scale somewhat further enlarged, taken substantially as indicated by the line 3—3 of Fig. 2.

Fig. 4 is a side elevational view, comparable with Fig. 3 but showing features of modification.

Fig. 5 is an end elevational view, taken from the general direction indicated by the arrows of Fig. 4, a right-hand half thereof being broken away.

Fig. 6 is a view of another alternative form, taken similarly to Fig. 4, but with the parts broken away to a median plain.

Fig. 7 is a partial top plan view, corresponding to the right hand portion of the Fig. 2, and taken substantially as indicated by the arrow 7 of Fig. 6.

Referring to details of that specific embodiment of the present invention which is shown in Figs. 1–3 inclusive, a motor vehicle 10 is shown as provided with a so-called one-man top 11, comprising a front frame element 12, and with a wind shield organization 13, comprising a stanchion or side-arm element 14. This terminates in a knob or head 15, disposed above a contriction or neck 16 and adapted to be received in and to extend through an opening in a bracket 17, secured to the frame element 12. Bracket 17, to which the present invention more particularly relates, will be seen to comprise not only an upwardly concave body portion 18, provided with a key-hole or other shaped aperture 19, for engagement by the neck 16 upon any post 14 after the upward insertion of a head 15 therethrough, but also with a downwardly extending flange 20 and an upwardly extending flange 21,—the result being a Z-shaped configuration, in longitudinal section, is best shown in Fig. 3.

The downwardly extending flange 20 preferably is outwardly convex and cylindrically or otherwise curved similarly to an inner face 22 of the frame element 12; and it may be provided with a central reinforcing rib 23, continuous with a depression 24 in the bottom of the main body 18 of said bracket, and also with a plurality of elongated openings 25, 25',—adapted to receive threaded elements for the adjustable attachment of the bracket 17 to the frame element 12,—the radius of curvature here common to frame element 12 and flange 20 being always different from, and preferably greater than the distance of said flange from aperture 19.

Although the bracket 17 is shown as upwardly concave, top edges 26, 26' of its side walls 27, 27', may be continuous with downwardly extending edges 28, 28', at the respective ends of the curved surface 29 of the flange 20,—through which the elongated openings 25, 25' horizontally extend; the radius of curvature of the face 29 may naturally be the same as that of the cooperating inner surface 22 of the frame element 12 and greater than the distance of the aperture 19 therefrom; and the structural characteristics of the inner or rearward flange 21 are intended to be such as to adapt some releasable interlocking or head-engaging or neck-engaging element, such as a thumb screw or set screw 30 to be carried thereby.

In Fig. 3, the flange 21 is shown as reinforced by the permanent addition of an inverted U-shaped clip 31 thereto. To assure a durable and non-slipping association of the parts referred to, a "staking" or welding effect may be relied upon,—somewhat as suggested at 32; and, however, the parts referred to are united, some or all plies thereof are intended to be tapped and/or punched and/or interiorly threaded, as at 33, favorably to the secure retention of the screw 30, or its equivalent,—the inner end 34 of this screw being adapted to engage either the neck 16 or a downwardly-diminishing surface of the head 15.

In the form shown in Figs. 4 and 5, instead of employing a separate clip in reinforcement of the flange 21, an extension $31^a$ thereof is shown as twice rebent upon itself in such manner as to provide 3-ply wall adapted to be punched or tapped and threaded at $33^a$, in the manner above referred to.

In Figs. 6 and 7 a comparatively short bracket $17^b$ is shown as provided with a flange $21^b$; and this may be arched in two directions and reinforced by an inward folding of an extension $31^b$, integral therewith, and also by an upward and inward folding of an ear or tab $32^b$,—utilizing metal which is displaced in the cutting of the key-hole or other opening $19^b$. The threaded opening $33^b$ is shown as carried through the three plies provided by the flange $21^b$, its extension $31^b$ and the tab $32^b$ in such manner as to adapt the inner end $34^b$ of a screw $30^b$ to engage either the neck or a downwardly diminishing portion of a head $15^b$ upon a side arm or stanchion $14^b$. The last-described form of the invention brings the head $15^b$ relatively near to the plane of attachment of the bracket $17^b$ by means of its flange $20^b$, and all of the described forms of the invention will be seen to provide for adequate reinforcement of not only the main body 18 ($18^a$, $18^b$) of a bracket, but for favorable curvatures and reinforcements of the respective flanges 20 ($20^a$ and $20^b$) and 21 ($21^a$, $21^b$). It will be seen that the flanges 20, 21 are oppositely convex and that the reinforcement of the flange 21 in all cases includes a rebent portion of sheet metal,—presumably a portion of the same stock from which the body of the bracket is formed; and that the aperture 19 (or $19^a$, or $19^b$) is, in all cases, of sufficient size to allow the head 15 to pass freely therethrough; and that the described organizations may aptly be referred to as one-man top brackets for the reason that the described parts are shaped favorably to the interconnection thereof and to such a self-retaining relationship as to obviate any necessity for holding the parts manually together during the tightening of the screw 30, or its equivalent.

Although the foregoing description has included several alternative embodiments of the present invention, it should be understood not only that various features thereof may be independently employed, but that numerous additional modifications might easily be devised, by workers in the art to which this case relates, without involving the slightest departure from the spirit and scope of the invention as the same is indicated in the above and following claim.

I claim:

In means suitable for releasably connecting a top with a windshield post: a bracket including a concave and apertured body which is provided with flanges angularly disposed with reference thereto, said flanges being respectively provided with openings for threaded elements serving to secure said bracket to a top frame element and to receive a screw engaging a terminal element on said post and being formed from sheet metal, and a thread-receiving portion of one of said flanges being reinforced by means of a rebent and integral sheet metal element which is threaded continuously therewith.

In testimony whereof I affix my signature.

STUART R. LAWTON.